(12) United States Patent
Yamada et al.

(10) Patent No.: US 11,056,862 B2
(45) Date of Patent: Jul. 6, 2021

(54) ELECTRICAL DEVICE CONNECTOR AND SWITCHGEAR

(71) Applicant: Mitsubishi Electric Corporation, Tokyo (JP)

(72) Inventors: Shintaro Yamada, Tokyo (JP); Tadahiro Yoshida, Tokyo (JP); Eiji Morito, Tokyo (JP); Shintaro Kuroaki, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 30 days.

(21) Appl. No.: 16/622,306

(22) PCT Filed: Jun. 20, 2017

(86) PCT No.: PCT/JP2017/022690
§ 371 (c)(1),
(2) Date: Dec. 13, 2019

(87) PCT Pub. No.: WO2018/235162
PCT Pub. Date: Dec. 27, 2018

(65) Prior Publication Data
US 2021/0151962 A1 May 20, 2021

(51) Int. Cl.
*H02B 13/00* (2006.01)
*H01B 17/26* (2006.01)
(Continued)

(52) U.S. Cl.
CPC .......... *H02B 13/005* (2013.01); *H01B 17/26* (2013.01); *H01R 24/38* (2013.01); *H02G 5/061* (2013.01)

(58) Field of Classification Search
CPC ...................... H02B 13/005; H01B 17/26–308
See application file for complete search history.

(56) References Cited

U.S. PATENT DOCUMENTS

| 3,845,458 A | 10/1974 | Himi |
| 6,392,157 B2 * | 5/2002 | Arioka ................. H02B 13/005 174/142 |

(Continued)

FOREIGN PATENT DOCUMENTS

| CN | 103066500 A * | 4/2013 |
| EP | 1249911 A1 | 10/2002 |

(Continued)

OTHER PUBLICATIONS

International Search Report (PCT/ISA/210) dated Sep. 26, 2018, by the Japan Patent Office as the International Searching Authority for International Application No. PCT/JP2017/022690.

(Continued)

*Primary Examiner* — Robert J Hoffberg
(74) *Attorney, Agent, or Firm* — Buchanan Ingersoll & Rooney PC

(57) ABSTRACT

An electrical device connector includes: a bus bar which includes a hollow portion extending in an axial direction and through holes extending in an axis-orthogonal direction, and which electrically connects a plurality of switchgears to each other; terminal members including bus bar support portions in which the bus bar is inserted, and including electrical device connection portions in which the insulation plugs are inserted and fixed; and stud bolts each having one end fixed to the corresponding switchgear, each extending in the axis-orthogonal direction through the corresponding through hole, and each fixing the corresponding insulation plug at the other end. Gaps are each formed between the corresponding stud bolt and the bus bar so as to allow communication between the hollow portion and an internal space of the corresponding terminal member.

16 Claims, 8 Drawing Sheets

(51) Int. Cl.
H02G 5/06 (2006.01)
H01R 24/38 (2011.01)

(56) References Cited

U.S. PATENT DOCUMENTS 9,385,493 B2 * 7/2016 Maroney .............. H02B 13/005
9,461,387 B2 * 10/2016 Heilersig ................ H01R 13/40
9,660,402 B2 * 5/2017 Maroney .............. H02B 13/005

FOREIGN PATENT DOCUMENTS

| EP | 2495833 A1 * | 9/2012 | ........... H02B 13/005 |
| EP | 2930804 A1 * | 10/2015 | ........... H02B 13/005 |
| EP | 3331112 A1 | 6/2018 | |
| JP | 2002345131 A * | 11/2002 | |
| JP | 2013219887 A | 10/2013 | |
| JP | WO2020136737 A1 * | 7/2020 | ........... H02B 13/045 |
| WO | 2004049530 A1 | 6/2004 | |
| WO | WO-2004049530 A1 * | 6/2004 | ............ H01R 24/38 |
| WO | WO-2011076955 A1 * | 6/2011 | ........... H01H 85/042 |
| WO | 2017022618 A1 | 2/2017 | |

OTHER PUBLICATIONS

Written Opinion (PCT/ISA/237) dated Sep. 26, 2018, by the Japan Patent Office as the International Searching Authority for International Application No. PCT/JP2017/022690.

Extended European Search Report dated May 8, 2020 for corresponding European patent application No. 17914995.0, 10 pages.

* cited by examiner

ELECTRICAL DEVICE CONNECTOR AND SWITCHGEAR

TECHNICAL FIELD

The present invention relates to an electrical device connector for connecting electrical devices used for, for example, switchgears for performing transmission/reception, distribution, and interruption of power, and switchgears.

BACKGROUND ART

Some conventional switchgears including bus conductors have the following configuration. In order to electrically connect two electrical devices, one of the electrical devices is provided with an insulation tubular body that encloses a contact terminal and that has an inner circumferential wall surface having a diameter that gradually decreases from an open end toward a closed end, and the other electrical device is provided with an insulation columnar body that supports a contact terminal at an end thereof and that has an outer circumferential wall surface having a diameter that gradually decreases toward the end correspondingly to the inner circumferential wall surface of the insulation tubular body (see, for example, Patent Document 1).

The technology disclosed in Patent Document 1 has the following problem. The insulation members are in close contact at connection portions of the electrical devices such that an enclosed space is formed inside. Consequently, if air remains at the connection portions at the time of connection, air trapping occurs owing to air incapable of escaping, resulting in reduction in insulation performance. As a countermeasure against such a problem, the following configuration has been known. When two electrical devices are connected, a deaeration tool to which a suction device can be attached/detached is fitted to a connection portion of one of the electrical devices, and air having entered between the connection portions of the two electrical devices is ejected to the outside with use of the deaeration tool (see, for example, Patent Document 2).

CITATION LIST

Patent Document

Patent Document 1: International Publication No. 2004-049530
Patent Document 2: International Publication No. 2017-022618

SUMMARY OF THE INVENTION

Problems to be Solved by the Invention

However, the technology disclosed in Patent Document 2 has the following problems. If the connection portions are formed from a hard material such as ethylene propylene rubber, it is difficult to ensure a space for inserting and pulling out the deaeration tool. Accordingly, a deaeration operation itself becomes difficult. Meanwhile, if the connection portions are formed from a soft material such as silicone rubber, the connection portions are easily deformed and an enclosed space is easily formed, and thus air trapping easily occurs. Accordingly, deaeration may be incompletely performed, resulting in reduction in insulation performance.

The present invention has been made in order to solve the above-described problems, and an object of the present invention is to obtain an electrical device connector that enables easy and effective deaeration of electrical device connection portions, and switchgears.

Solution to the Problems

The present invention includes: a bus conductor including a hollow portion extending in an axial direction and through holes extending in an axis-orthogonal direction orthogonal to the axial direction, the bus conductor being configured to electrically connect a plurality of switchgears to each other; insulation plugs each having one end connected to an electrical device which is connected to the bus conductor, the insulation plugs each being configured to electrically insulate the electrical device and the bus conductor; terminal members each including a bus conductor support portion which has a hollow cylindrical shape extending in the axial direction and in which the bus conductor is inserted, the terminal members each further including an electrical device connection portion which extends in the axis-orthogonal direction and in which the corresponding insulation plug is inserted and fixed; and fixing members each having one end fixed to the corresponding switchgear and each extending in the axis-orthogonal direction through the corresponding through hole, the fixing members each fixing the corresponding insulation plug at the other end, wherein gaps are each formed between the corresponding fixing member and the bus conductor so as to allow communication between the hollow portion and an internal space of the corresponding terminal member.

Effect of the Invention

According to the present invention, deaeration of the electrical device connection portions can be easily and effectively performed.

DESCRIPTION OF EMBODIMENTS

Embodiment 1

Figure 1:
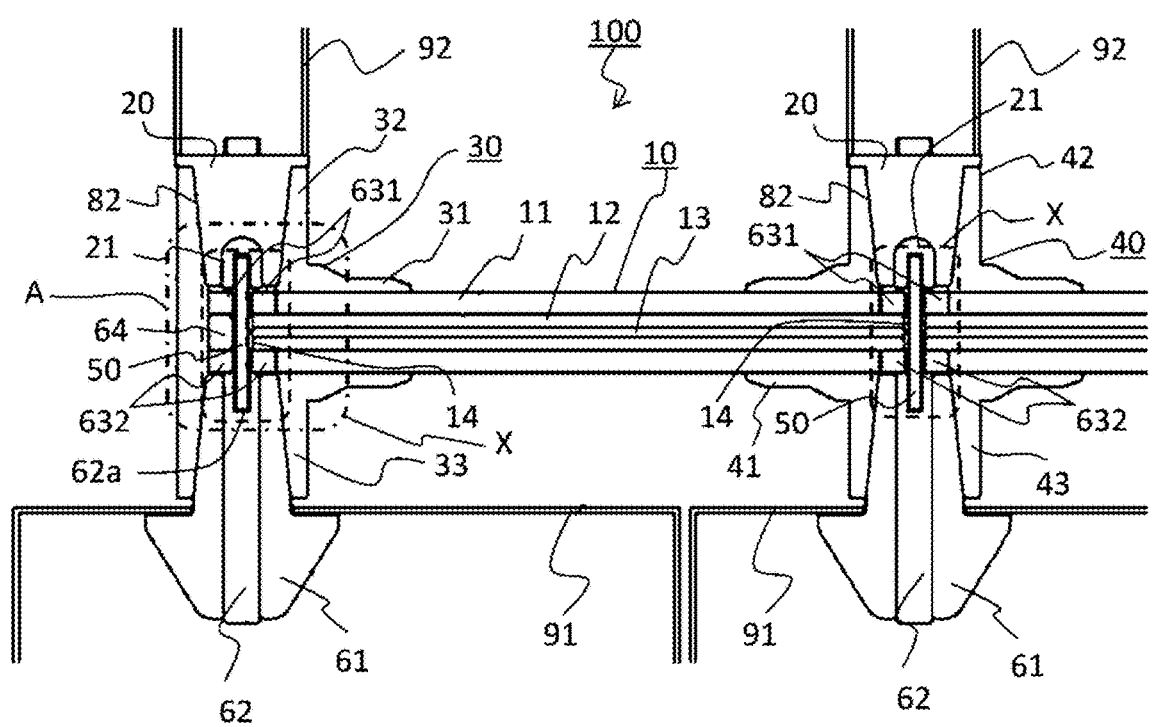
FIG. 1 shows a cross-sectional view of an electrical device connector according to embodiment 1 of the present invention.
Figure 2:
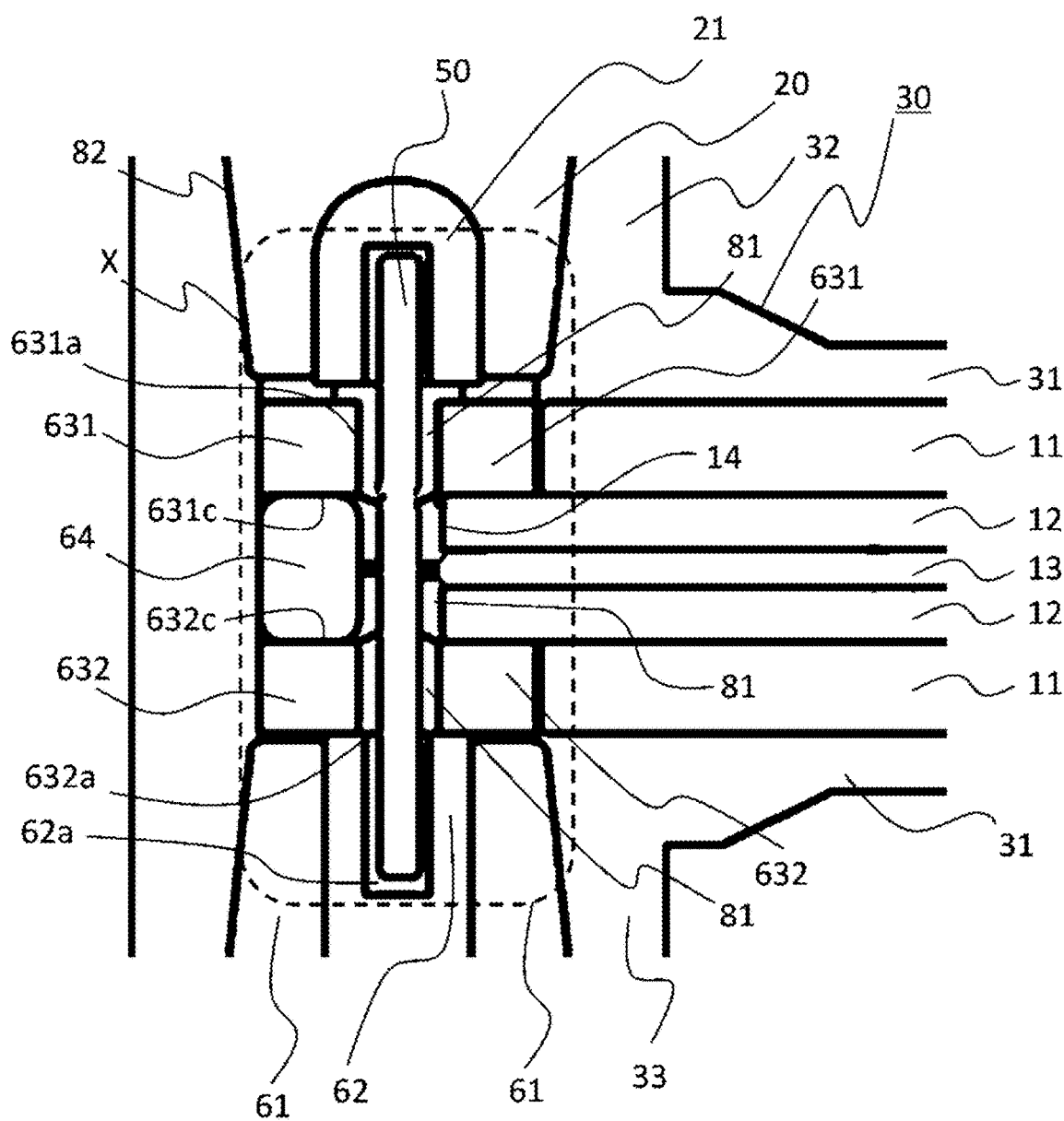
FIG. 2 shows an enlarged cross-sectional view of portion A in FIG. 1.

Hereinafter, embodiment 1 of the present invention will be described with reference to FIG. 1 to FIG. 6. FIG. 1 shows a cross-sectional view of an electrical device connector according to embodiment 1 of the present invention, and FIG. 2 shows an enlarged cross-sectional view of portion A in FIG. 1. An electrical device connector 100 includes: a bus bar 10, i.e. a bus conductor, which extends along the arrangement direction of a plurality of switchgears 91 each accommodating a disconnector and the like (not shown), and which electrically connects the plurality of switchgears 91 to each other; insulation plugs 20, i.e. insulation tubular bodies, for electrical insulation between the bus bar 10 and instrument voltage transformers 92, i.e. electrical devices, which are connected to the bus bar 10 on a side opposite to the switchgears 91; and terminal members 30 and 40 disposed at positions that correspond to the positions of the switchgears 91. The terminal members 30 and 40 are formed from a flexible insulation material such as silicone rubber or ethylene propylene rubber, and include: bus bar support portions 31 and 41, i.e. bus conductor support portions, supporting the bus bar 10; electrical device connection portions 32 and 42 in which the insulation plugs 20 are inserted and fixed; and switchgear connection portions 33 and 43 in which bushings 61 fixed to the switchgears 91 are inserted and fixed. Although the instrument voltage transformers 92 are used as the electrical devices in embodiment 1, the electrical devices are not limited to the instrument voltage transformers 92, but may be, for example, arresters.

The terminal member 30 corresponds to the switchgear 91 positioned at an edge, and has a T shape obtained by disposing the electrical device connection portion 32 and the switchgear connection portion 33 at one end of the bus bar support portion 31. The terminal member 40 corresponds to the switchgear 91 positioned at an intermediate portion, and has a cruciform obtained by disposing the electrical device connection portion 42 and the switchgear connection portion 43 at a center portion of the bus bar support portion 41.

Figure 3:
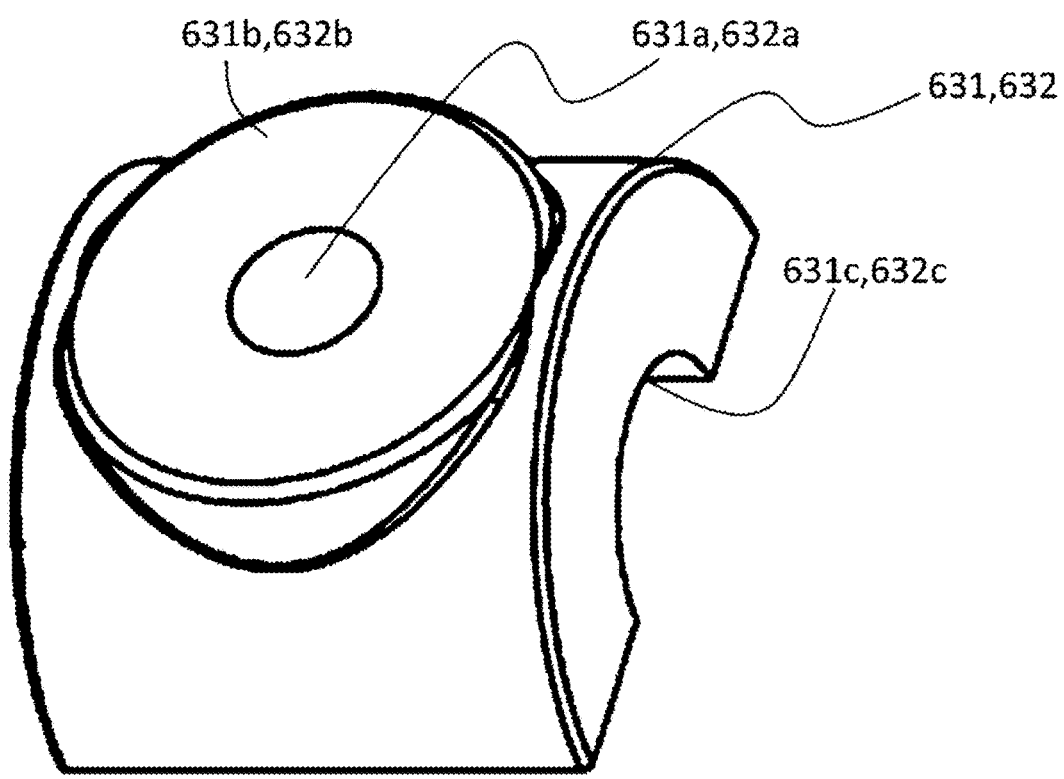
FIG. 3 shows a perspective view of arc conductors in embodiment 1 of the present invention.

The bus bar 10 is obtained by coating, with an insulation portion 11 formed from an epoxy resin or the like, the circumference of a cylindrical conductor portion 12 in which a hollow portion 13 extending in the axial direction is formed. At each of positions on the bus bar 10 corresponding to the positions of the respective switchgears 91, more specifically, at the position at which the bus bar support portion 31, 41 and the switchgear connection portion 33, 43 of the terminal member 30, 40 intersect with each other, the conductor portion 12 is exposed by removing the insulation portion 11 by at least 5 mm for electrical connection to the switchgear 91, and a through hole 14 through which a fixing stud bolt 50, i.e. a fixing member, is inserted is formed so as to extend in an axis-orthogonal direction that is orthogonal to the axial direction. Arc conductors 631 and 632 shown in FIG. 3 are mounted, from above and below, to the portion at which the conductor portion 12 is exposed. The arc conductors 631 and 632 are arch-shaped conductors having thicknesses as shown in FIG. 3, seats 631b and 632b are disposed so as to project from the outer circumferential surfaces of the arc conductors 631 and 632, and the arc conductors 631 and 632 have through holes 631a and 632a which have the same cross-sectional shape and size as those of the through hole 14 of the bus bar 10. The arc conductors 631 and 632 are mounted to the conductor portion 12 by adjusting the positions of the through holes 631a and 632a to the position of the through hole 14 of the bus bar 10 and bringing inner circumferential surfaces 631c and 632c which are half-cylindrical circumferential surfaces into contact with the outer circumferential surface of the conductor portion 12. At an end portion (corresponding to the switchgear 91 positioned at the edge) of the bus bar 10, a cylindrical end-portion conductor 64 is disposed so as to be apart from the end of the bus bar 10 by not less than the diameter of the through hole 14, and the end-portion conductor 64 is sandwiched between the arc conductors 631 and 632.

The through hole 14 of the bus bar 10 and the through holes 631a and 632a of the arc conductors 631 and 632, each have a diameter that is larger than the diameter of the stud bolt 50. Accordingly, a gap 81 is formed between the stud bolt 50 and the bus bar 10 and between the stud bolt 50 and the arc conductors 631 and 632, in a state where the stud bolt 50 is inserted. The gap 81 allows communication between the hollow portion 13 of the bus bar 10 and an internal space X of the terminal member 30, 40, more specifically, a space enclosed by the insulation plug 20, the terminal member 30 or the terminal member 40, and the bushing 61. Consequently, air freely flows between the internal space X and the hollow portion 13.

The bushing 61 is formed from a hard insulation material such as an epoxy resin, and has a trapezoidal frustum shape in which the cross-sectional area thereof increases toward the switchgear 91. An end portion, on the switchgear 91 side, of the bushing 61 is incorporated into the switchgear 91, and a projecting portion formed on the outer circumferential surface of the end portion is engaged with a housing of the switchgear 91. The switchgear connection portion 33, 43 covering the outer circumferential surface of the bushing 61 is formed so as to have a tapered inner circumferential surface such that the cross-sectional area of a hollow portion of the switchgear connection portion 33, 43 increases as the distance to the switchgear 91 becomes shorter.

The bushing 61 covers a connection conductor 62 which has a cylindrical or substantially rectangular-parallelepiped shape having an axial direction that is parallel to the axis-orthogonal direction of the bus bar 10. The connection conductor 62 has one end connected to the switchgear 91, and has, at the other end, a hole portion 62a into which the stud bolt 50 is screwed. The stud bolt 50 has one end screwed into the hole portion 62a, and extends in the axis-orthogonal direction in the terminal member 30, 40 via the through hole 632a of the arc conductor 632, the through hole 14 of the bus bar 10, and the through hole 631a of the arc conductor 631, and the other end of the stud bolt 50 is screwed into a bolt connection portion 21 formed in the insulation plug 20.

The bushing 61 and the connection conductor 62 are connected, at end portions thereof on the bus bar 10 side, to the arc conductor 632, thereby being electrically connected to the bus bar 10. That is, the bus bar 10 is electrically connected to the switchgear 91 via the arc conductor 632 and the connection conductor 62.

The materials of the connection conductor 62, the arc conductors 631 and 632, and the end-portion conductor 64 are not particularly limited, and only have to be a metal having excellent conductivity such as copper or aluminum.

The insulation plug 20 is formed from a hard insulation material such as an epoxy resin, and has a trapezoidal cylindrical shape in which the diameter of a cross section thereof increases as the distance to the bus bar 10 becomes longer. The electrical device connection portion 32, 42 covering the outer circumferential surface of the insulation plug 20 is formed so as to have a tapered inner circumferential surface such that the cross-sectional area of a hollow portion of the electrical device connection portion 32, 42 increases as the distance to the instrument voltage transformer 92 becomes shorter. At an insulation boundary surface portion 82 which is a boundary portion between the outer circumferential surface of the insulation plug 20 and the inner circumferential surface of the electrical device connection portion 32, 42, the outer circumferential surface of the insulation plug 20 and the inner circumferential surface of the electrical device connection portion 32, 42 are in close contact with each other while exerting a predetermined surface pressure to each other. The insulation plug 20 is fixed by means of the stud bolt 50 screwed into the bolt connection portion 21 formed in an end portion, of the insulation plug 20, on the bus bar 10 side.

Figure 4:
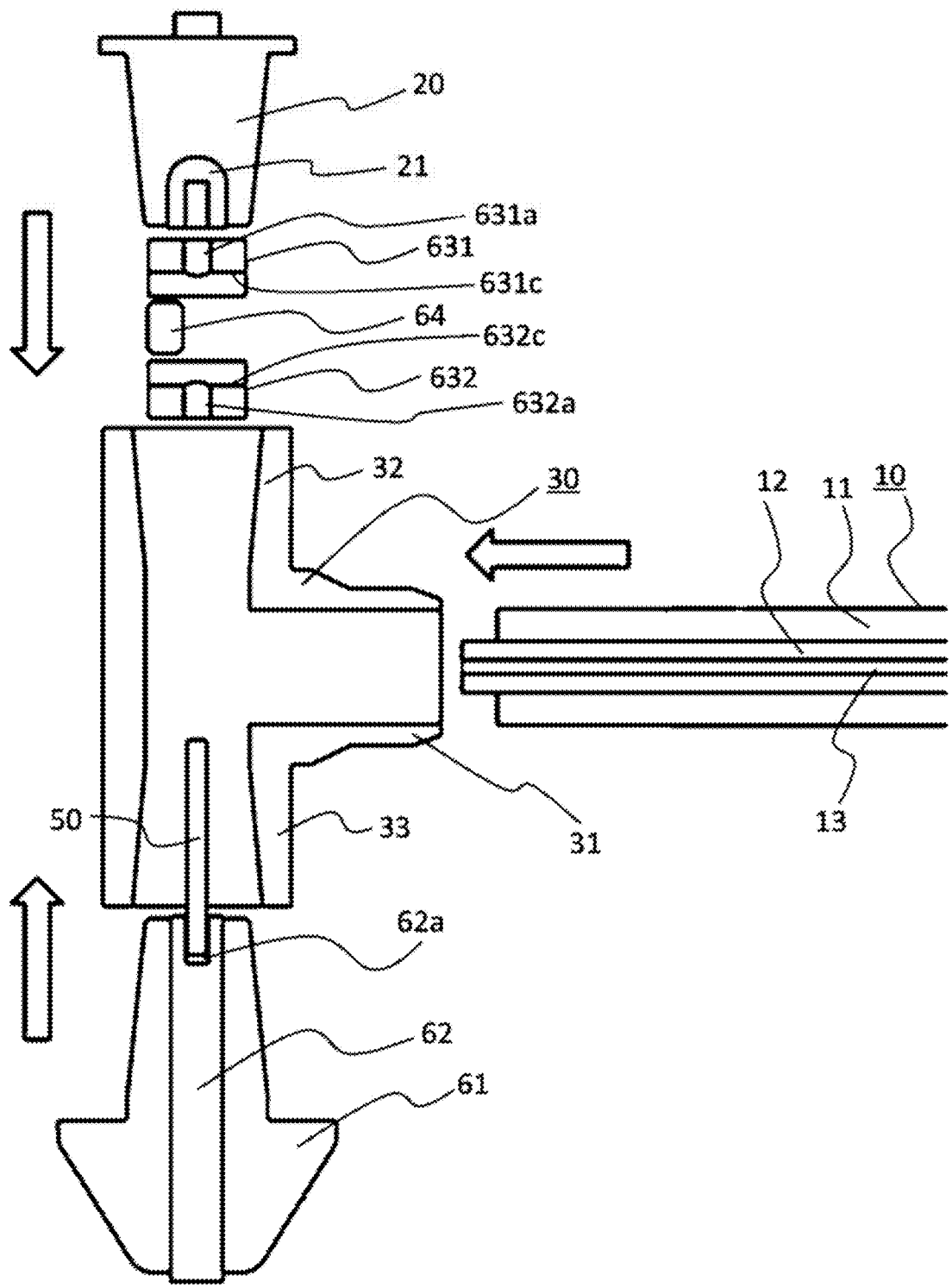
FIG. 4 is an exploded cross-sectional view of portion A in FIG. 1.
Figure 5:
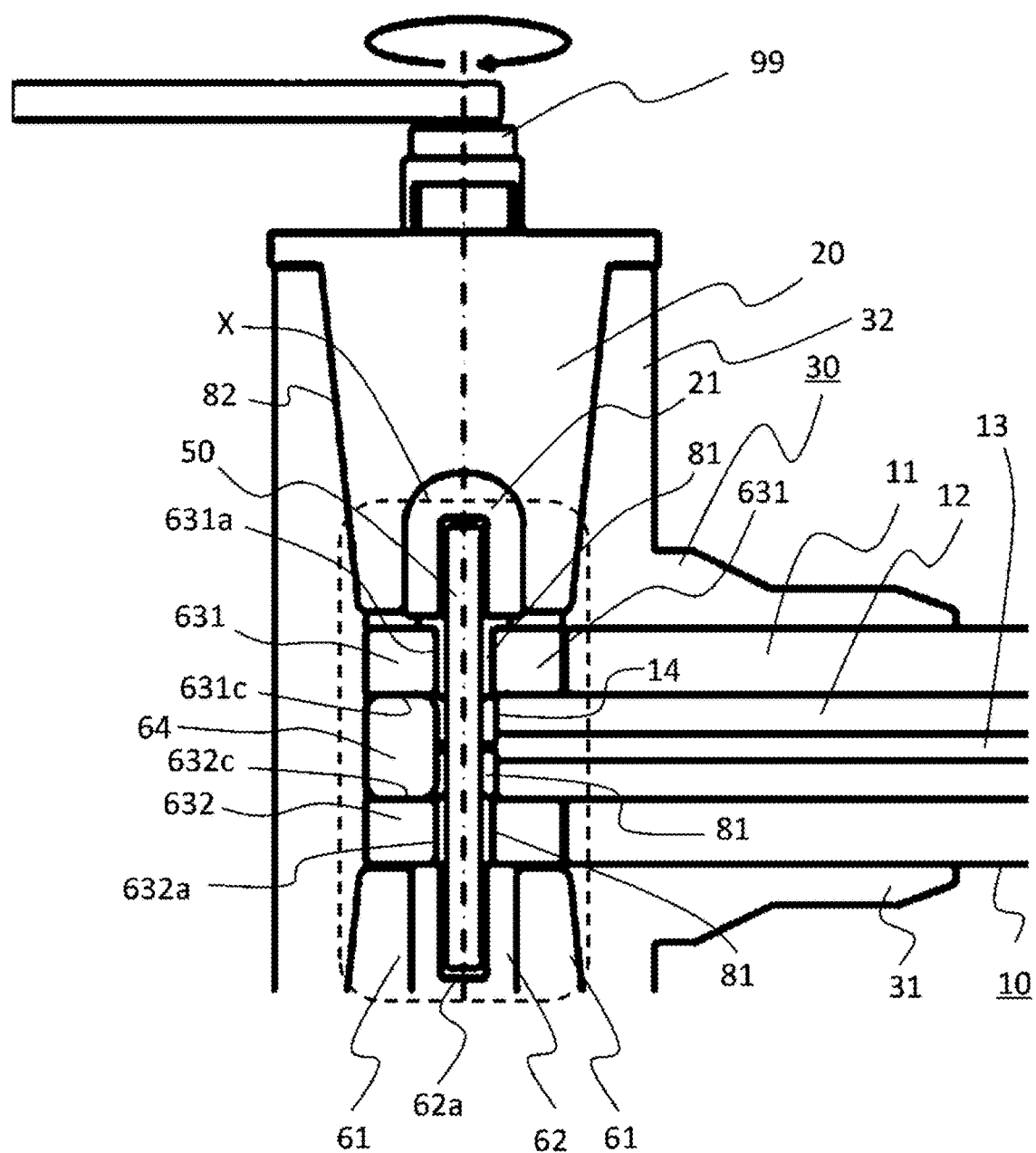
FIG. 5 is a view showing a state where an insulation plug is inserted and fixed in a terminal member.
Figure 6:
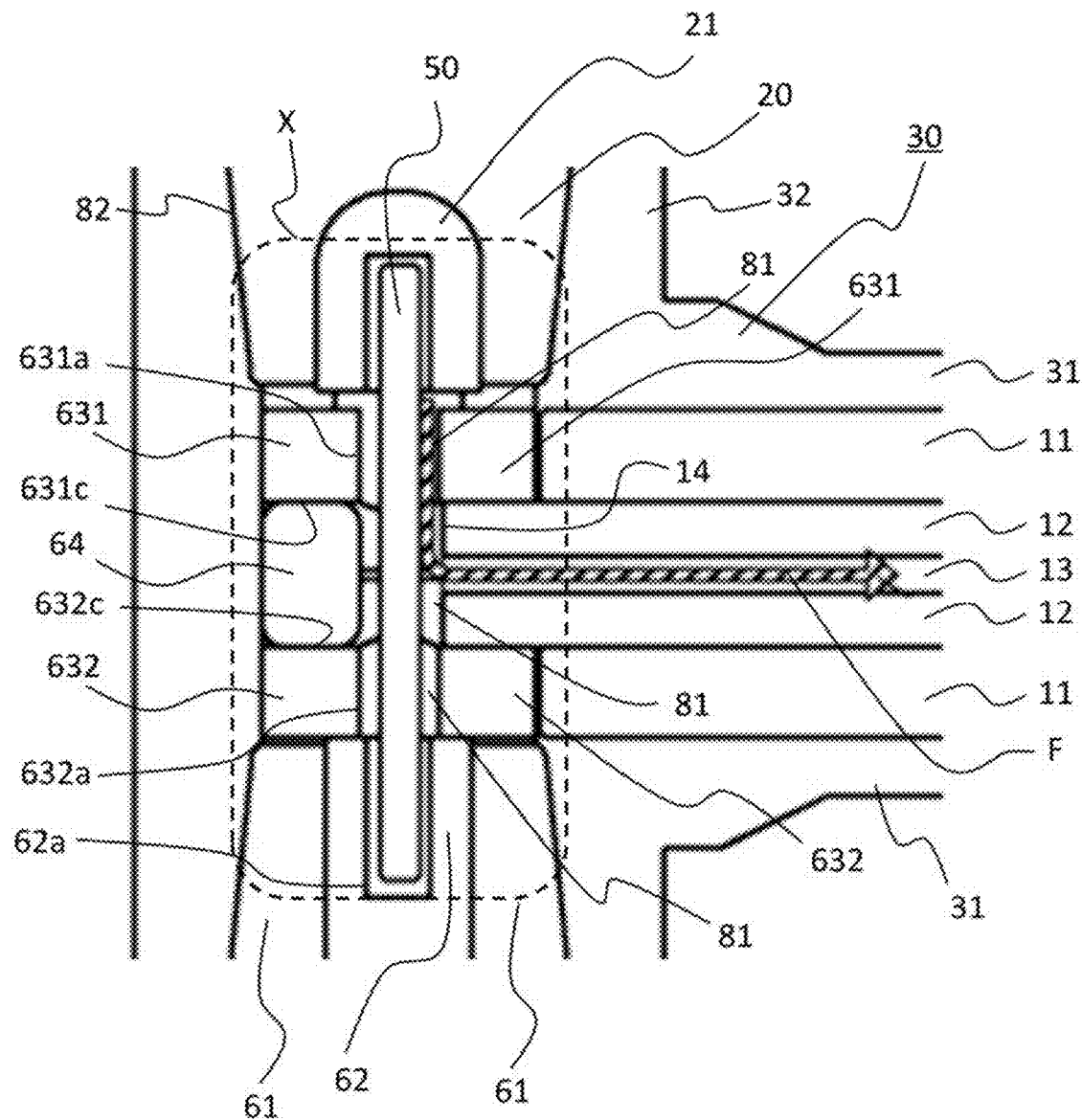
FIG. 6 is a view showing flow of air removed through a hollow portion of a bus bar.

Next, deaeration at the time of connection of the bus bar 10 will be described. FIG. 4 is an exploded cross-sectional view of portion A in FIG. 1, and FIG. 5 is a view showing a state where the insulation plug is inserted and fixed in a first terminal member. Here, connection of the bus bar 10 in the terminal member 30 will be described below. The same manner of connection as that described below applies to connection of the bus bar 10 in the terminal member 40. First, the bushing 61 and the connection conductor 62 in which the stud bolt 50 is screwed into the hole portion 62*a*, are inserted from below the switchgear connection portion 33. The stud bolt 50 in this state is inserted through the through hole 632*a* so as to fix the arc conductor 632, the end-portion conductor 64 is fitted to the inner circumferential surface 632*c*, and thereafter, the stud bolt 50 is inserted through the through hole 631*a* so as to fix the arc conductor 631. Accordingly, a cylindrical space in which the conductor portion 12 of the bus bar 10 is to be fitted, is formed between the inner circumferential surface 631*c* of the arc conductor 631 and the inner circumferential surface 632*c* of the arc conductor 632. Then, the bus bar 10 is inserted into the bus bar support portion 31 such that an end portion of the conductor portion 12 is fitted in the cylindrical space formed between the arc conductor 631 and the arc conductor 632. At this time, the distance between an end surface of the conductor portion 12 and the end-portion conductor 64 is made equal to or longer than the diameter of the stud bolt 50 such that the gap 81 is formed between the bus bar 10 and the stud bolt 50.

After the bus bar 10 is connected as described above, the insulation plug 20 is inserted and fixed in the electrical device connection portion 32. In the insertion and the fixation of the insulation plug 20, an end of the stud bolt 50 is screwed into the bolt connection portion 21 first, and the bolt connection portion 21 is fastened to the stud bolt 50 by means of a fastening tool such as a torque wrench 99 as shown in FIG. 5, thereby squeezing the insulation plug 20 to a predetermined position while increasing the diameter of the electrical device connection portion 32. Accordingly, the predetermined surface pressure is exerted at the insulation boundary surface portion 82, thereby fixing the insulation plug 20 into the electrical device connection portion 32.

When the insulation plug 20 is inserted and fixed, air remaining in the internal space X is compressed by the insulation plug 20 being squeezed, so that the air pressure increases. However, the surface pressure at the insulation boundary surface portion 82 increases and air becomes less likely to enter the insulation boundary surface portion 82, whereas air freely flows from the gap 81 into the hollow portion 13. Owing to this state, as the insulation plug 20 is inserted further, air in the internal space X is pressed downward, thereby being squeezed out from the internal space X into the hollow portion 13 of the bus bar 10 as in flow F of air shown in FIG. 6.

According to embodiment 1, deaeration of the electrical device connection portions can be easily and effectively performed. More specifically, the hollow portion extending in the axial direction is formed in the bus bar electrically connecting the plurality of switchgears to each other, and the diameter of the through hole allowing insertion therethrough of the stud bolt for fixing the insulation plug which electrically insulates the bus bar and the instrument voltage transformer connected to the bus bar, is made larger than the diameter of the stud bolt, thereby forming the gap which allows communication between the internal space of the terminal member and the hollow portion of the bus bar. Accordingly, air remaining in the internal space is squeezed out into the hollow portion of the bus bar when the insulation plug is inserted and fixed. Therefore, by performing an operation for inserting and fixing the insulation plug, removal of remaining air is also performed, and thus deaeration can be performed without performing any separate deaeration operation, whereby deaeration of the connection portion is simplified. In addition, air more assuredly flows into the hollow portion of the bus bar since the surface pressure at the insulation boundary surface portion increases owing to the insertion and the fixation. Accordingly, deaeration can be effectively performed, whereby it is possible to more assuredly prevent insulation failure due to air entering the insulation boundary surface portion.

Embodiment 2

Figure 7:
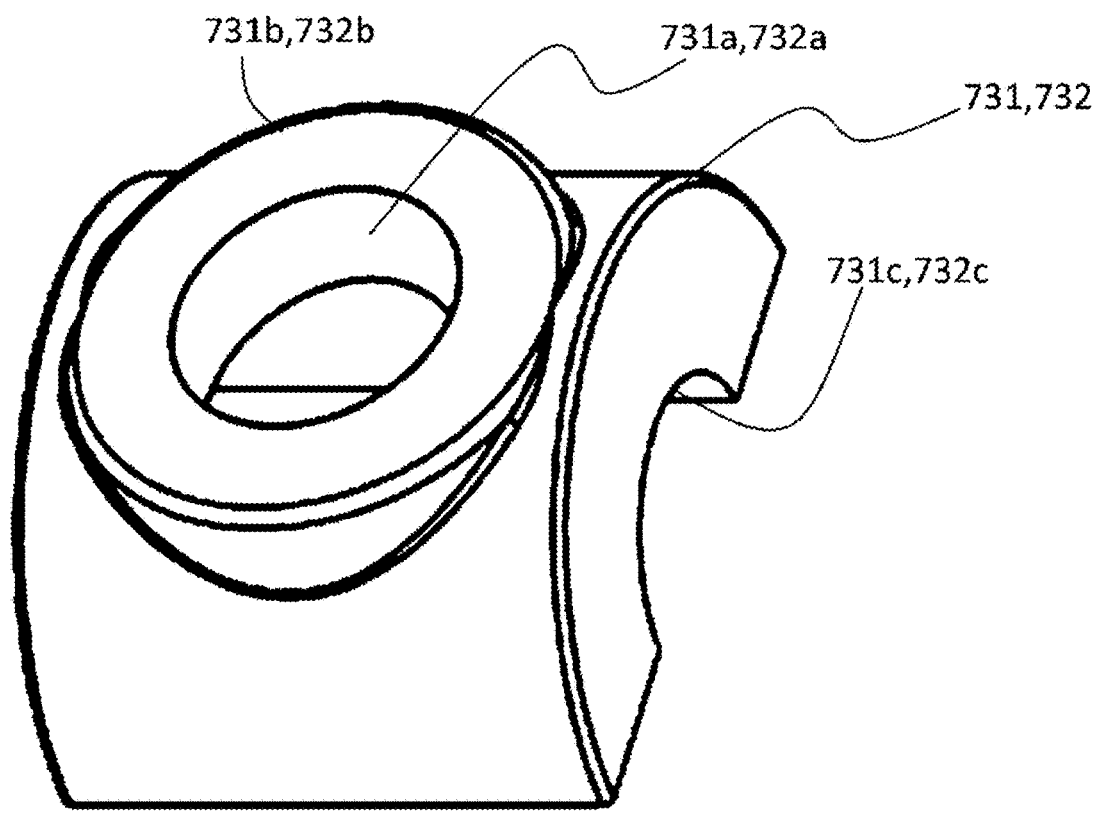
FIG. 7 shows a perspective view of arc conductors in embodiment 2 of the present invention.

Hereinafter, embodiment 2 of the present invention will be described with reference to FIG. 7. It is noted that parts that are the same as or correspond to those in FIG. 1 to FIG. 6 are denoted by the same reference characters and the description thereof is omitted. Embodiment 2 is different in the diameter of the through hole through which the stud bolt is inserted. FIG. 7 shows a perspective view of arc conductors in embodiment 2. In an arc conductor 731, 732, while the size of a seat 731*b*, 732*b* is made the same as the size of the seat 631*b*, 632*b* in embodiment 1, the diameter of a through hole 731*a*, 732*a* is made not less than twice the diameter of the stud bolt 50, thereby increasing the proportion of the volume of the through hole 731*a*, 732*a*. An inner circumferential surface 731*c*, 732*c* is the same as the inner circumferential surface 631*c*, 632*c* in embodiment 1. Although not shown, embodiment 2 is the same as embodiment 1 in that the through hole 14 of the bus bar 10 and the through hole 731*a*, 732*a* of the arc conductor 731, 732 have the same cross-sectional shape and size, and thus the diameter of the through hole 14 of the bus bar 10 is also not less than twice the diameter of the stud bolt 50.

The other features are the same as those in embodiment 1, and thus the description thereof is omitted.

According to embodiment 2, the same effects as those in embodiment 1 can be obtained.

In addition, since the diameters of the through holes formed in the bus bar and the arc conductors are made not less than twice the diameter of the stud bolt, the gap formed between the stud bolt and the bus bar and between the stud bolt and the arc conductors, increases, thereby improving the air permeability. Accordingly, air remaining in the internal space of the terminal member can be more assuredly caused to flow into the hollow portion of the bus bar.

In addition, it is possible to further reduce the risk of occurrence of insulation failure. More specifically, since the proportion of the through hole is increased while the size of the seat of the arc conductor is made the same as that in embodiment 1, the volume of the internal space increases, and thus air in the internal space becomes less likely to be compressed. Accordingly, it is possible to further reduce the risk of occurrence of insulation failure due to air entering the insulation boundary surface portion owing to increase in the pressure of air remaining in the internal space.

Embodiment 3

Embodiment 3 is different from embodiment 1 or 2 in that the terminal member 30, 40 is formed from a rubber having greater hardness than silicone rubber, such as fluororubber or ethylene propylene rubber, for example. In the case of being formed from such a rubber, the terminal member 30, 40 becomes less likely to be deformed, and thus greater force is required for increasing the diameter of the electrical device connection portion 32, 42 when the insulation plug 20 is inserted in the electrical device connection portion 32, 42, whereby greater surface pressure is exerted at the insulation boundary surface portion 82 after the insulation plug 20 is inserted and fixed. The other features are the same as those in embodiment 1, and thus the description thereof is omitted.

According to embodiment 3, the same effects as those in embodiment 1 can be obtained.

In addition, it is possible to further reduce the risk of occurrence of insulation failure. More specifically, since the terminal member is formed from a rubber having greater hardness such as fluororubber or ethylene propylene rubber, the surface pressure at the insulation boundary surface portion increases, and thus air remaining in the internal space becomes less likely to enter the insulation boundary surface portion. Accordingly, even when the pressure of air remaining in the internal space increases owing to increase in the temperature, for example, such entering of air is prevented, whereby it is possible to further reduce the risk of occurrence of insulation failure.

Embodiment 4

Figure 8:
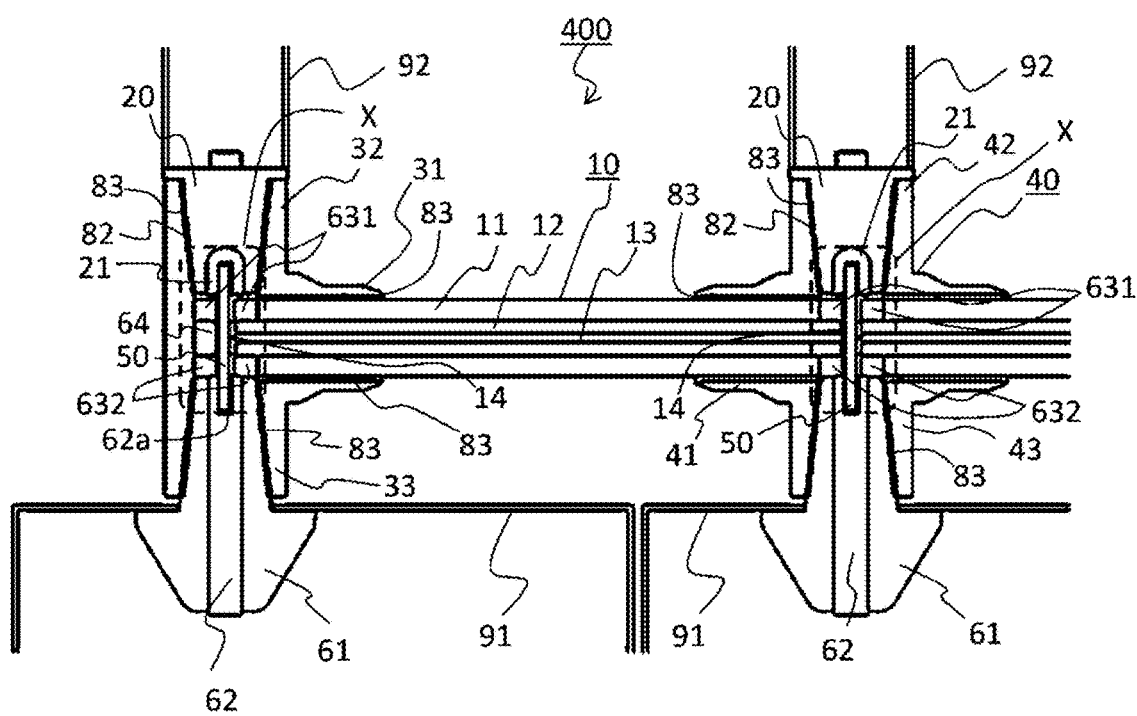
FIG. 8 shows a cross-sectional view of an electrical device connector according to embodiment 4 of the present invention.

Hereinafter, embodiment 4 of the present invention will be described with reference to FIG. 8. It is noted that parts that are the same as or correspond to those in FIG. 1 to FIG. 6 are denoted by the same reference characters and the description thereof is omitted. FIG. 8 shows a cross-sectional view of an electrical device connector according to embodiment 4. In an electrical device connector 400, the terminal member 30, 40 is formed from a hard insulation material such as an epoxy resin, and an insulation sheet 83, i.e. a layered insulator, formed from a soft and flexible insulation material such as silicone rubber is interposed between the inner circumferential surface of the bus bar support portion 31, 41 of the terminal member 30, 40 and the outer circumferential surface of the insulation portion 11 of the bus bar 10, between the inner circumferential surface of the electrical device connection portion 32, 42 and the outer circumferential surface of the insulation plug 20 (i.e., at the insulation boundary surface portion 82), and between the inner circumferential surface of the switchgear connection portion 33, 43 and the outer circumferential surface of the bushing 61.

The other features are the same as those in embodiment 1, and thus the description thereof is omitted.

According to embodiment 4, the same effects as those in embodiment 1 can be obtained.

In addition, it is possible to further reduce the risk of occurrence of insulation failure. More specifically, since the terminal member is formed from a hard insulation material such as an epoxy resin and the insulation sheet formed from a soft and flexible insulation material is interposed between the terminal member and the insulation plug, the property of close contact between the terminal member and the insulation plug at the insulation boundary surface portion is maintained and the surface pressure at the insulation boundary surface portion is further increased. Accordingly, air remaining in the internal space can be more assuredly prevented from entering the insulation boundary surface portion, whereby it is possible to further reduce the risk of occurrence of insulation failure due to such entering of air.

It is noted that, within the scope of the present invention, the above embodiments may be freely combined with each other, or each of the above embodiments may be modified or abbreviated as appropriate.

DESCRIPTION OF THE REFERENCE CHARACTERS 10 bus bar
11 insulation portion
12 conductor portion
13 hollow portion
14 through hole
20 insulation plug
30, 40 terminal member
31, 41 bus bar support portion
32, 42 electrical device connection portion
33, 43 switchgear connection portion
50 stud bolt
61 bushing
62 connection conductor
631, 632, 731, 732 arc conductor
631a, 632a, 731a, 732a through hole
81 gap
82 insulation boundary surface portion
83 insulation sheet
91 switchgear
92 instrument voltage transformer
100, 400 electrical device connector
X internal space

The invention claimed is:
1. An electrical device connector comprising:
a bus conductor including a hollow portion extending in an axial direction and through holes extending in an axis-orthogonal direction orthogonal to the axial direction, the bus conductor being configured to electrically connect a plurality of switchgears to each other;
insulation plugs each having one end connected to an electrical device which is connected to the bus conductor, the insulation plugs each being configured to electrically insulate the electrical device and the bus conductor;
terminal members each including a bus conductor support portion which has a hollow cylindrical shape extending in the axial direction and in which the bus conductor is inserted, the terminal members each further including an electrical device connection portion which extends in the axis-orthogonal direction and in which a corresponding one of the insulation plugs is inserted and fixed; and
fixing members each having one end fixed to a corresponding one of the switchgears and each extending in the axis-orthogonal direction through a corresponding one of the through holes, the fixing members each having another end fixed to the corresponding one of insulation plugs,
wherein gaps are each formed between a corresponding one of the fixing members and the bus conductor so as to allow communication between the hollow portion and an internal space of a corresponding one of the terminal members.

2. The electrical device connector according to claim 1 wherein each through hole has a diameter not less than twice a diameter of the corresponding one of the fixing members.

3. The electrical device connector according to claim 2 wherein
the terminal members are formed from silicone rubber.

4. The electrical device connector according to claim 2 wherein
the terminal members are formed from fluororubber or ethylene propylene rubber.

5. The electrical device connector according to claim 2 wherein the terminal members are formed from an epoxy resin, and flexible layered insulators are each interposed between the corresponding one of the terminal members and the corresponding one of insulation plugs.

6. The electrical device connector according to claim 1 wherein
the terminal members are formed from silicone rubber.

7. The electrical device connector according to claim 1 wherein
the terminal members are formed from fluororubber or ethylene propylene rubber.

8. The electrical device connector according to claim 1 wherein the terminal members are formed from an epoxy resin, and flexible layered insulators are each interposed between the corresponding one of the terminal members and the corresponding one of insulation plugs.

9. A plurality of switchgears arranged in an arrangement direction and electrically connected to each other by a bus conductor extending along the arrangement direction, each of the switchgears being connected to the electrical device connector according to claim 1.

10. A plurality of switchgears arranged in an arrangement direction and electrically connected to each other by a bus conductor extending along the arrangement direction, each of the switchgears being connected to the electrical device connector according to claim 2.

11. A plurality of switchgears arranged in an arrangement direction and electrically connected to each other by a bus conductor extending along the arrangement direction, each of the switchgears being connected to the electrical device connector according to claim 3.

12. A plurality of switchgears arranged in an arrangement direction and electrically connected to each other by a bus conductor extending along the arrangement direction, each of the switchgears being connected to the electrical device connector according to claim 4.

13. A plurality of switchgears arranged in an arrangement direction and electrically connected to each other by a bus conductor extending along the arrangement direction, each of the switchgears being connected to the electrical device connector according to claim 5.

14. A plurality of switchgears arranged in an arrangement direction and electrically connected to each other by a bus conductor extending along the arrangement direction, each of the switchgears being connected to the electrical device connector according to claim 6.

15. A plurality of switchgears arranged in an arrangement direction and electrically connected to each other by a bus conductor extending along the arrangement direction, each of the switchgears being connected to the electrical device connector according to claim 7.

16. A plurality of switchgears arranged in an arrangement direction and electrically connected to each other by a bus conductor extending along the arrangement direction, each of the switchgears being connected to the electrical device connector according to claim 8.

* * * * *